Feb. 12, 1952 R. E. TAYLOR 2,585,187
ROSIN CONTAINER
Filed Nov. 16, 1949
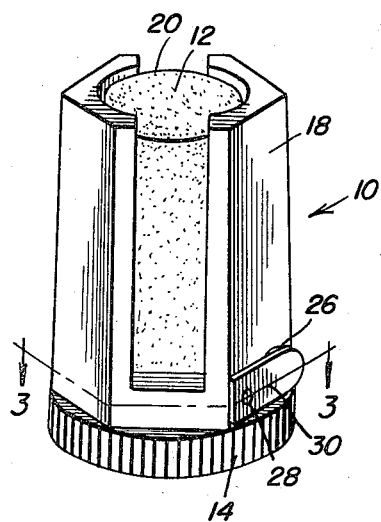
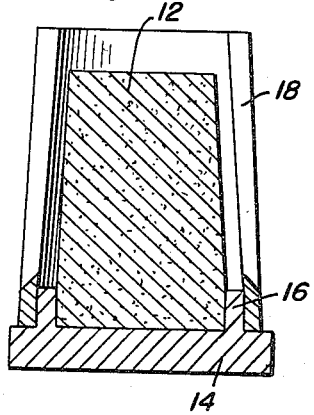
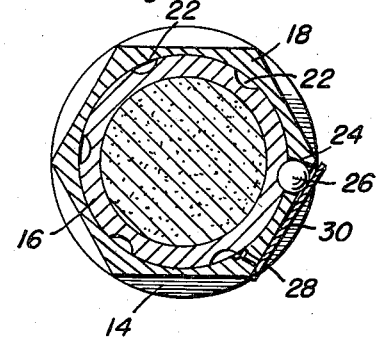
Inventor
Richard E. Taylor
By Clarence A. O'Brien
and Harvey B. Jacobson
Attorneys Patented Feb. 12, 1952

2,585,187

UNITED STATES PATENT OFFICE 2,585,187

ROSIN CONTAINER

Richard E. Taylor, Sedalia, Mo.

Application November 16, 1949, Serial No. 127,636

2 Claims. (Cl. 206—56)

This invention relates to the class of containers, and more particularly to a novel holder for supporting rosin in a manner so as to be readily available for use by a musician.

When a conventional cake of rosin is used, it need be supported by a suitable container since it is of such brittle nature as to readily crack and become useless if unsupported. Conventional supports rigidly hold the cake of rosin in but one position so that a musician can have access through a slot in the container to only one portion of one surface of the rosin cake. Thusly, after a bow of a violin or other similar instrument has been drawn several times across the face of the rosin cake exposed, a groove will be worn therein. Accordingly, a musician will be unable to use the entire cake of rosin but will be forced to continue drawing his bow across the rosin cake within the groove, thus wasting the remainder of the cake. Therefore, it is an object of this invention to provide a rosin container whereby the entire cake of rosin may be satisfactorily consumed.

It is another object of the invention to provide means for rotating a cake of rosin into any one of several positions so as to avoid the possibility of forming deep grooves in the cake of rosin.

A further object of the invention resides in the provision of a holder for a cake of rosin that will rigidly support the cake, yet which would permit the ready refilling thereof when the cake has been entirely consumed.

Still further objects reside in the provision of a rosin container that is strong, durable, highly efficient in operation, simple in construction and manufacture, capable of being made from a number of divergent materials, relatively inexpensive, and quite pleasing in appearance.

These, together with the various ancillary objects of the invention which will become apparent as the following description proceeds, are attained by this rosin container, a preferred embodiment of which has been illustrated in the accompanying drawings, by way of example only, wherein:

Figure 1 is a perspective view of the rosin container comprising the present invention;

Figure 2 is a vertical sectional view as taken along a transverse axis of the rosin holder; and Figure 3 is a horizontal sectional view as taken along line 3—3 in Figure 1.

With continuing reference to the accompanying drawings wherein like reference numerals designate similar parts throughout the various views, reference numeral 10 is used to generally designate the rosin container in which the cake of rosin designated by reference numeral 12 is adapted to be emplaced. The rosin cake 12 is preferably made with its upper portions of less diameter than its lower extremities. The purpose for this shape of rosin cake will become apparent as the following description proceeds.

A cylindrical base 14 is preferably molded from a suitable plastic, preferably those of thermal setting characteristics, and colored in any one of a plurality of pleasing shades is provided with a knurled peripheral edge and a tubular flange 16 molded integrally therewith and rising therefrom.

An upwardly tapering body portion 18 of substantially hexagonal shape is positioned with its bottom edge abutting the base 14 in an encompassing relationship to the flange 16. The body portion 18 is provided with a hollow interior and has a transverse slot 20 therethrough which is open at its upper end. The cake of rosin 12 is positioned within the bounds of the flange 16 in a press fitted engagement therewith. The body portion 18 encompasses the rosin cake 12. The rosin cake 12 and the body 18 are so tapered in form as to prevent the rosin cake 12 from falling out of the container if the engagement between the rosin cake and the flange became insecure.

The flange 16 is provided with a plurality of spaced substantially hemispherical recesses 22 therein. The body portion 18 is provided with an aperture 24 therethrough in which a ball bearing 26 may be emplaced so as to be engaged within the selected recess 22 when such is in alignment with the opening 24. By means of a rivet 28 or the like a spring 30 continuously urges the ball bearing 26 against the body 18 and retains the ball 26 in the recess 22 when such is in alignment so as to provide six positions for the cake relative to the body 18. Additionally, the spring being secured to the body, the ball 26 engaging the body within the aperture 24, and the recesses being in the flange 16 secured to the base 14, the ball bearing 26 provides means for securing the body 18 to the base 14.

To refill the container, it is merely necessary to press back the spring 30 and remove the ball bearing. Then the body can be lifted from the base, a new cake 12 of rosin being placed within the bounds of the flange 16, the body 18 can then be replaced on the base, the ball bearing 26 can be replaced and the spring 30 permitted to engage the ball bearing and urge it into a recess 22.

Since from the foregoing, the construction and advantages of this rosin container are readily apparent, further description is believed to be unnecessary.

However, since numerous modifications will readily occur to those skilled in the art after a consideration of the foregoing specification and accompanying drawings, it is not intended to limit the invention to the precise embodiment of rosin holder shown and described, but all suitable modifications and equivalents may be resorted to which fall within the scope of the appended claims.

Having described the invention, what is claimed as new is:

1. A rosin container comprising a base, a tubular flange secured to said base adapted to receive one end of a cake of rosin, a hollow body portion encompassing said flange and said cake and having a transversely extending slot therethrough opening at one end thereof, a plurality of spaced recesses in said flange, an aperture in said body portion adapted to be aligned with one of said recesses, a ball bearing selectively engaged in one of said recesses and said aperture, and spring means secured to said body portion urging said ball bearing against said flange.

2. A rosin container comprising a base, a tubular flange secured to said base and adapted to receive one end of a cake of rosin, a hollow body portion encompassing said flange and the cake of rosin and having a transversely extending slot therethrough opening at one end thereof, said flange having a plurality of circumferentially spaced recesses, said body portion having an aperture adapted to be aligned with one of said recesses, a ball bearing disposed within said aperture and selectively engageable in said recesses, and spring means on said hollow body portion and engaging said ball bearing for continuously urging said ball bearing against said flange and into a selected one of said recesses.

RICHARD E. TAYLOR.

REFERENCES CITED

The following references are of record in the file of this patent:

UNITED STATES PATENTS

| Number | Name | Date |
|---|---|---|
| 1,494,736 | Cottrell | May 20, 1924 |
| 1,531,869 | Miele | Mar. 31, 1925 |
| 2,236,224 | Raschkind | Mar. 25, 1941 |
| 2,349,800 | Lee | May 30, 1944 |
| 2,437,373 | Bernstein | Mar. 9, 1948 |
| 2,485,320 | Rosenthal | Oct. 18, 1949 |

FOREIGN PATENTS

| Number | Country | Date |
|---|---|---|
| 82,537 | Switzerland | Oct. 1, 1919 |
| 161,368 | Great Britain | Apr. 14, 1921 |